Patented Aug. 17, 1943

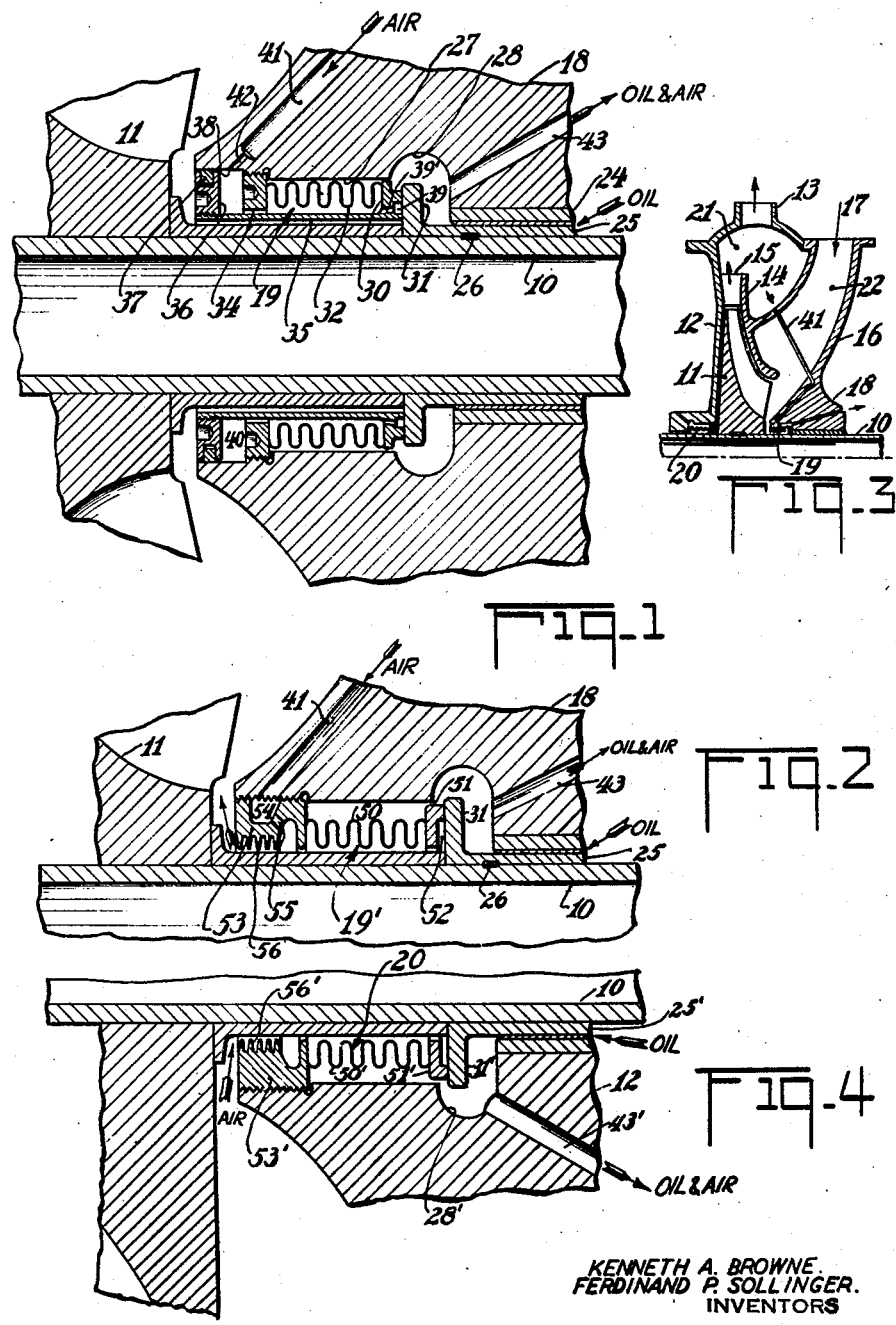

2,326,824

UNITED STATES PATENT OFFICE 2,326,824

OIL SEAL

Kenneth A. Browne, Fairlawn, and Ferdinand P. Sollinger, Paterson, N. J., assignors to Wright Aeronautical Corporation, a corporation of New York Application November 16, 1940, Serial No. 365,954

11 Claims. (Cl. 230—132)

This invention relates to oil seals for compressors and is particularly concerned with face type oil seals as used in high speed, high capacity air blowers such for instance as the superchargers of aircraft engines.

In aircraft engine superchargers, air is drawn from or delivered to a carburetor and subsequently is delivered to the engine at a pressure somewhat above atmospheric. The impellers rotate at speeds up to 30,000 R. P. M. and accordingly, the bearing or bearings upon which the impeller is carried must be supplied with an adequate amount of oil to assure both adequate cooling and lubrication. Due to the fact that oil is fed to the bearings under pressure, and that an end of each bearing is subject to supercharger suction or pressure unless an adequate seal is provided between the compressor and the bearing end, a substantial amount of oil may be drawn into the supercharger and be mixed with the blown air. Furthermore, positive seals are necessary at the bearings to prevent seepage of oil into the supercharger housing when the engine is not running, particularly when the oil supply is above the bearings.

An object of this invention is to provide a seal which shall prevent leakage of oil into the blower or compressor, and a further object is to provide a sealing arrangement whose friction shall be automatically relieved at high speed rotation of the impeller to avoid burning of the sealing faces while still preventing the leakage of oil into the air being worked upon by the blower.

Further objects of the invention will be appreciated by reading the annexed detailed description in connection with the drawing, in which:

Fig. 1 is a longitudinal section through a supercharger bearing and seal according to the invention;

Fig. 2 is a similar partial section of an alternative embodiment of the invention;

Fig. 3 is a longitudinal section, on a reduced scale, showing the blower assembly with which the seals of Figs. 1 and 2 are adapted to be used; and Fig. 4 is a partial longitudinal section of another form of seal.

First referring to Fig. 3, we show a more or less conventional supercharger assembly comprising a high speed shaft 10 to which is keyed an impeller 11. The system is embraced by a housing comprising, a diffuser plate 12 defining also an exit conduit 13, an impeller shroud 14 carrying diffuser vanes 15, and an intake casing 16 defining an intake opening 17 and comprising a bearing boss 18 within which the shaft 10 is borne. The seal assemblies are indicated at 19 and 20. The housing components above mentioned define, in connection with the impeller, a high pressure zone 21 and a low pressure zone 22 respectively at the impeller delivery and at the impeller eye.

Now referring to Fig. 1, showing one form of the seal assembly 19, it will be seen that the bearing boss 18 carries a bushing 24 forming the bearing for the sleeve 25 embracing and secured to rotate with the shaft 10, as by a key 26. The boss 18 is counterbored as at 27 and 28 to receive the seal assembly 19 which comprises a wear ring 30 in rotatable sealing engagement with a flange end 31 of the sleeve 25. The ring 30 is secured to an elastic metallic bellows 32 at one end, the other end of the bellows being secured to a threaded collar 34 screwed into the boss 18. The ring 30 also carries an integral sleeve 35 extending leftwardly within the bellows 33 and in clearance relation relative to the bellows and to the shaft 10. The left end of the sleeve 35 carries an annular piston 36 of larger diameter than the ring 30, having a groove within which is disposed a split ring 37 engaging a cylindrical counterbore 38 in the extreme left end of the bearing boss 18. It will be noted that the ring 30 is formed with a face groove 39 communicating through drillings 39' with the space between the bellows 33 and the sleeve 35, which zone also is in free communication with an annular space 40 between the annular piston 36 and the lock ring 34. This space is placed in communication with the high pressure side of the blower by means of a conduit 41 leading therefrom to the zone 21 via an orifice 42 which limits the amount of air bled from the zone 21.

Pressure oil is forwarded by conventional means to the righthand end of the bearing established by the bushing 24 and the sleeve 25, this oil leaking from the left end of the bearing into the counterbore 28 and draining therefrom through a drain passage 43.

The seal against oil leakage is established between the flange 31 and the ring 30, and under conditions of non-operation and of low blower outlet pressure this seal is established by elastic pressure of the bellows to prevent the leakage of lubricating oil into the intake zone of the supercharger. As blower output increases due to increased speed of the impeller, positive pressure is built up in the zone 21 which is carried, through the conduit 41 and orifice 42 to the zone 40, whereby elevated pressure acts on the piston 36 and on the ring 30.

Since the piston 36 is larger than the ring 30, the assembly of 30, 35 and 36 is urged to the left opposing the spring force of the bellows, and when the pressure is high enough, the ring 30 is lifted from contact with the flange 31.

The sealing elements are thus held out of contact with one another so that wear and possible burning of the elements is prevented. When these elements are separated, a small amount of high pressure air from the supercharger high pressure zone 21, limited as to quantity by the orifice 42, will bleed into the oil scavenged through the passage 43 from which it may be separated as such oil is deposited in an oil reservoir. A small amount of high pressure air leaks into the supercharger but the amount of air leakage is negligible.

In the seal 19' shown in Fig. 2, some of the elements are identical with those shown in Fig. 1 and are numbered similarly. The spring metallic bellows 50 is secured at one end to an enlarged ring 51 engaging the flange 31 in spinning sealing relation, the ring having an annular recess 52 on its face, while the other end of the bellows 50 is sealed to a ring 53 screwed into the bearing boss 18. Said ring 53 is provided with an external groove 54 communicating with the high pressure air passage 41 and the wall of the ring is drilled to form an orifice 55 so that high pressure air may pass to the zone between the bellows 50 and the shaft 10 for leakage between the elements 31 and 51. Elevated pressure from the orifice 55 acts on the ring 51 from the recess 52 to raise the sealing face from the flange 31 and allows limited air bleed across the sealing faces. A labyrinth 56 or other suitable restriction formed at the inner diameter of the ring 53 allows part of the air to flow into the low pressure zone of the supercharger.

The functioning of the sealing assembly of Fig. 2 is obviously generally similar to that shown in Fig. 1 but the high pressure air bleed to the supercharger is somewhat greater since more air would be lost through the labyrinth 56 than would be lost between the flange 31 and ring 30 of Fig. 1. Both arrangements, however, are operative and effective to accomplish the objects set forth at the beginning of this specification.

Fig. 4 shows a form of the sealing assembly 20, and is inverted as respects the showing of Fig. 3 for the sake of indicating its structural similarity to the forms of Figs. 1 and 2. The several parts bear the same numbers as do the parts in Fig. 2, but are primed. Housing member 12 replaces the boss 18. The high pressure passage 41 and orifice 55 are eliminated, since high pressure air leaks to the seal between the housing 12 and the back of the impeller 11, through the labyrinth 56'. The high pressure air thereafter acts on the ring 51' to overcome the spring force of the bellows 50' and then to lift the ring 51' from the flange 31', air bleeding into the counterbore 28' and scavenging, with bearing oil, through the passage 43'. The labyrinth 56' in this case acts as an air limiting orifice and may, if desired, be replaced by a drilling in the member 53' and a spinning split seal ring between said member and the shaft.

It is appreciated that metallic bellows and face type shaft seals broadly are old in the art but it is believed that this is the first instance where such seals are provided with means to relieve metallic sealing contact under high speed conditions while still preventing the leakage of lubricating oil or other liquid through the sealing assembly.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. A seal assembly for a high speed shaft borne in a housing comprising a flange on the shaft, a ring in sealing and rotating engagement therewith, a metallic bellows fixed at one end to the housing and secured at its other end to said ring, a sleeve secured to the ring extending through the bellows, means extending between said sleeve and housing beyond the fixed end of said bellows and providing a slidable seal to the space therebetween, a high pressure fluid conduit communicating with the space between said sleeve and bellows, and ducts through the ring establishing communication between said space and the sealing face of said ring.

2. A seal assembly for a high speed shaft borne in and extending from a housing, the latter having a counterbore through which the shaft passes, comprising a seal flange on the shaft, an elastic bellows secured at one end to the housing adjacent the outer end of the counterbore and extending therein, a seal ring secured to the other end of the bellows, having contact sealing engagement with said flange when the shaft is static, and means to conduct gas under pressure to the space between said shaft and bellows for blowby between and separation of the flange and ring during shaft rotation.

3. A seal assembly for a high speed shaft borne in and extending from a housing, the latter having a counterbore through which the shaft passes, comprising a seal flange on the shaft, an elastic bellows secured at one end to the housing adjacent the outer end of the counterbore and extending therein, a seal ring secured to the other end of the bellows, having contact sealing engagement with said flange when the shaft is static, means to conduct gas under pressure to the space between said shaft and bellows for blowby between and separation of the flange and ring during shaft rotation, and means to restrict the flow of gas from said space.

4. A seal assembly for a high speed shaft borne in and extending from a housing, the latter having a counterbore through which the shaft passes, comprising a seal flange on the shaft, an elastic bellows secured at one end to the housing and lying within the counterbore, a seal ring secured to the other end of the bellows, having contact sealing engagement with said flange when the shaft is static, means to conduct gas under pressure to the space between said shaft and bellows for blowby between and separation of the flange and ring during shaft rotation, and means to restrict the flow of gas from said space, said means comprising a labyrinth between said shaft and housing outboard of said bellows.

5. A seal assembly for a high speed shaft borne in and extending from a housing having an end counterbore around the shaft, comprising a flange on the shaft near the counterbore bottom, a sleeve in the counterbore having a sealing face at one end engaging said flange and having a sealing annulus at the other end slidably engaging the surface of the counterbore, means to feed high pressure gas to the counterbore, inwardly of the annulus, and an elastic bellows secured at one end to the housing inward of said gas feeding means and secured at its other end to the sleeve near said sealing face.

6. In a housing having a bearing for a high speed shaft extending therethrough, the combination of a seal for the bearing comprising a counterbore in the housing concentric with the bearing, a drain passage within the housing and communicating with the inner end of the counterbore to carry off surplus lubricant bleeding from the bearing end, a flange on the shaft near the inner end of the counterbore, an elastic bellows within the counterbore sealed at its outer end to the housing, a seal ring sealed to the inner end of the bellows and having contact sealing engagement with the flange when the shaft is stationary, a labyrinth seal between the housing and shaft at the outer end of said counterbore, and means to feed a gaseous fluid to the space between the shaft and bellows for leakage through the labyrinth seal and through the seal between the ring and flange to relieve the latter elements from contact; during shaft rotation, and to scavenge excess lubricant into the drain.

7. In a housing having a bearing for a high speed shaft extending therethrough, the combination of a seal for the bearing comprising a counterbore in the housing concentric with the bearing, a drain passage within the housing and communicating with the inner end of the counterbore to carry off surplus lubricant bleeding from the bearing end, a flange on the shaft near the inner end of the counterbore, an elastic bellows within the counterbore sealed at its outer end to the housing, a seal ring sealed to the inner end of the bellows and having contact sealing engagement with the flange when the shaft is stationary, said ring having an annular face groove facing the flange, and means to feed a gaseous fluid under pressure to said face groove to lift the ring from contact with the flange during shaft rotation to allow fluid escape to said drain passage and to the exterior of the shaft and housing.

8. In a housing having a bearing for a high speed shaft extending therethrough, the combination of a seal for the bearing comprising a counterbore in the housing concentric with the bearing, a drain passage within the housing and communicating with the inner end of the counterbore to carry off surplus lubricant bleeding from the bearing end, a flange on the shaft near the inner end of the counterbore, an elastic bellows within the counterbore sealed at its outer end to the housing, a seal ring sealed to the inner end of the bellows and having contact sealing engagement with the flange when the shaft is stationary, said ring having an annular face groove facing the flange and having holes through the ring from the groove to a point between the ring and the space between the bellows and the shaft, an auxiliary seal at the outer end of the counterbore, and means to feed a gaseous fluid under pressure inboard of said auxiliary seal to pass to said groove for lifting the ring from sealing engagement with said flange during shaft rotation, said fluid bleeding into the counterbore and to said drain passage.

9. In a housing having a bearing for a high speed shaft extending therethrough, the combination of a seal for the bearing comprising a counterbore in the housing concentric with the bearing, a drain passage within the housing and communicating with the inner end of the counterbore to carry off surplus lubricant bleeding from the bearing end, a flange on the shaft near the inner end of the counterbore, an elastic bellows within the counterbore sealed at its outer end to the housing, a seal ring sealed to the inner end of the bellows and having contact sealing engagement with the flange when the shaft is stationary, said ring having an annular face groove facing the flange and having holes therethrough, a sleeve secured to the ring at its inner diameter extending outwardly between the shaft and bellows, flexible means to seal the sleeve to the housing at the outer end of the counterbore, and means to feed a gaseous fluid under pressure to the space between said bellows and sleeve for passage to the ring groove for lifting the ring from the flange during shaft rotation, said fluid bleeding into the counterbore and to said drain passage.

10. In a fluid compressor having a driving shaft and an oil fed bearing with a drain therefor, the combination of a statically closed ring seal between the bearing and shaft biased into sealing engagement therewith when the shaft is stationary to prevent the flow of bearing oil into said compressor, means to subject said seal to the compressor output fluid pressure, said output fluid pressure being effective upon high speed compressor operation to open said seal and bleed said fluid therethrough at least partly into said drain, whereby said fluid bleed scavenges excess oil into said drain.

11. In a fluid compressor having a driving shaft and an oil fed bearing therefor, the combination of a statically closed ring seal between the bearing and shaft biased into sealing engagement therewith when the shaft is stationary to prevent the flow of bearing oil into said compressor, means to subject said seal to the compressor output fluid pressure, said output fluid pressure being effective upon high speed compressor operation to open said seal and bleed said fluid therethrough against the path of possible leakage of said bearing oil into said compressor, and means to permit the escape of said fluid bleed and the excess bearing oil.

KENNETH A. BROWNE.
    FERDINAND P. SOLLINGER.